March 18, 1958 R. J. BARBOUR ET AL 2,827,322
FASTENER
Filed April 5, 1956 2 Sheets-Sheet 1
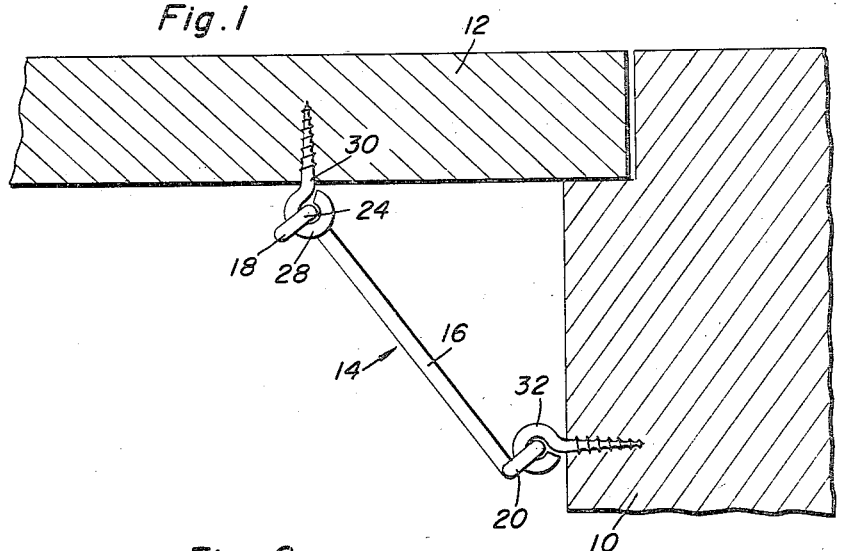
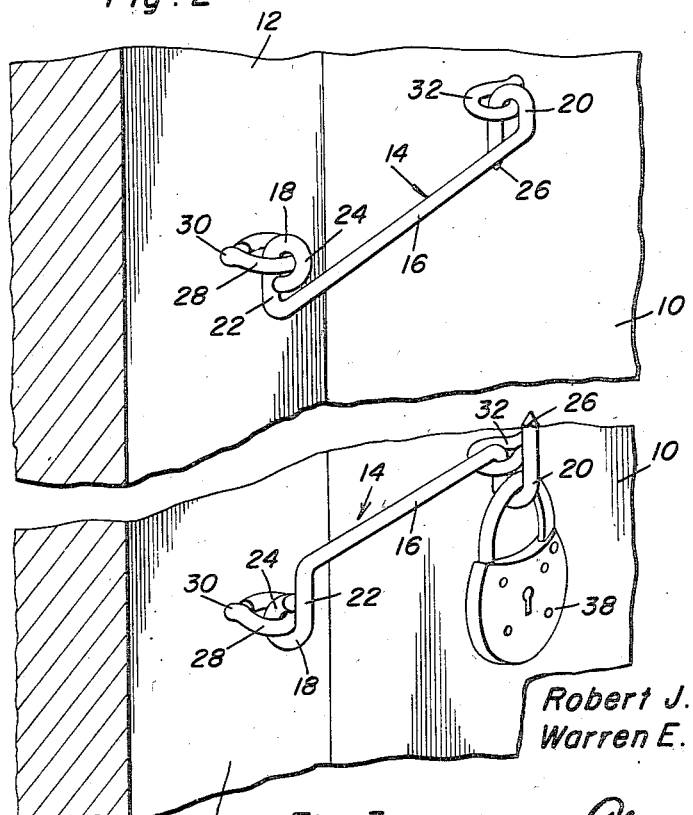
Robert J. Barbour
Warren E. Barbour
INVENTORS March 18, 1958   R. J. BARBOUR ET AL   2,827,322
FASTENER
Filed April 5, 1956   2 Sheets-Sheet 2
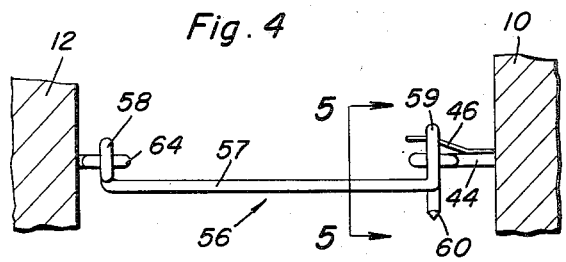
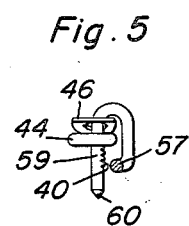
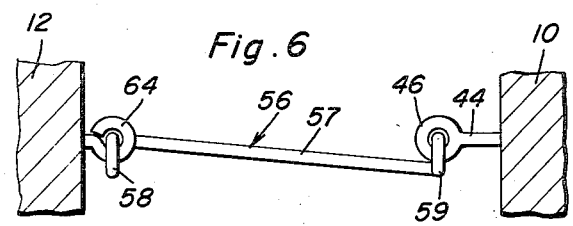
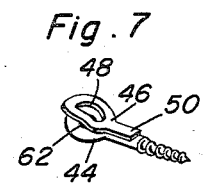
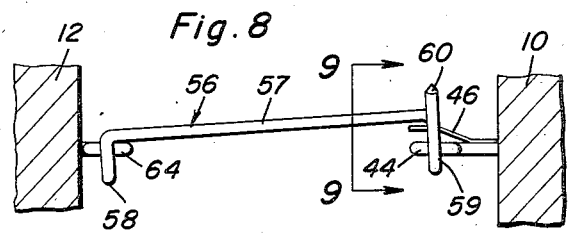
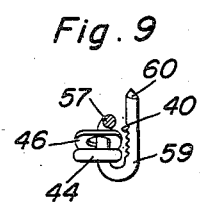
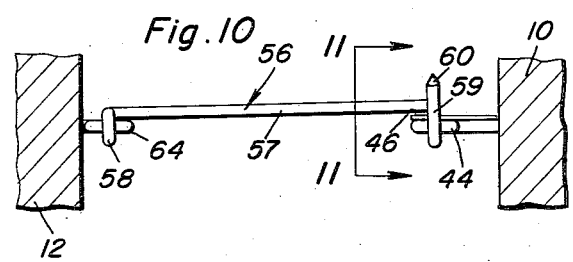
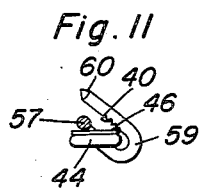
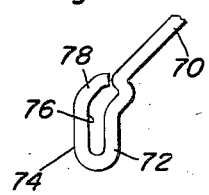
Robert J. Barbour
Warren E. Barbour
INVENTORS
BY Clarence A. O'Brien
and Harvey B. Jackson
Attorneys

United States Patent Office 2,827,322
Patented Mar. 18, 1958

2,827,322

FASTENER

Robert J. Barbour and Warren E. Barbour, Terre Haute, Ind.

Application April 5, 1956, Serial No. 576,351

8 Claims. (Cl. 292—104)

This invention relates to improvements in fasteners and particularly to a fastener of the type that is customarily used on doors, screen doors, window screens and the like.

An object of the invention is to provide improvements in fasteners of the hook type whereby it is impossible to inadvertently release the lock and virtually impossible to release the lock that is made by the fastener from the outside of the door, screen or other device with which the fastener is operatively connected.

A more specific object of the invention is to provide an improved fastener adapted to be operatively connected with two devices, for example a screen door and door jamb, the fastener having a shank provided at one end with a laterally offset eye and provided at the other end with a laterally offset hook, the hook and the eye being on opposite sides of the longitudinal axis of the shank with the eye being mounted pivotally on a screw eye and the hook being operative to engage the screw eye in the other of the devices from that which carries the first screw eye.

With regard to the nature and substance of the invention, a fastener constructed in the manner mentioned above must have a positive rotational force applied to it in order to lock the same and accordingly, in order to release it a rotational force must be applied in the opposite direction. In connecting the hook to the screw eye, the bill of the hook is first inserted through the aperture in the screw eye and then the shank rotated approximately 180°. This means that the bill is then facing upwardly with respect to the screw eye in which it was inserted, but in view of the offset position of the hook a part of the shank closely adjacent to the hook comes to bear against the screw eye preventing it from moving downwardly but necessitating that the shank be rotated about 180° in order that there may be a separation of the fastener from its screw eye.

A further object of the invention is to provide an improved fastener of the type described wherein there is a loop formed by a part of the hook and a part of the screw eye with which it is operatively connected in order to accommodate a padlock or other additional fastening medium preventing the separation of the parts of the fastener without an authorizing key for the padlock.

In addition to the foregoing it is a further object of the invention to improve the locking effect between a screw eye and its hook by having serrations on the hook and by having a spring member attached to the screw eye and arranged such that it is normally spaced from the eye of the screw eye so that a positive force to depress the spring member is required in order that the hook may become separated therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a horizontal sectional view of a pair of devices that are adapted to be locked, the devices being representative of any two devices that are movable with respect to each other and that are susceptible to using a common hook and eye, a fastener embodying the principles of the invention being operatively connected to the devices and in the partially latched position;

Figure 2 is a perspective view of the structural arrangement of Figure 1;

Figure 3 is a perspective view of the structure shown in Figure 2 but in the fully latched position there being an optionally usable padlock in the loop formed by a part of the hook and one of the screw eyes;

Figure 4 is a schematic view of another form of the invention showing the two screw eyes connected to schematic representations of two devices, the screw eyes and remainder of the fastener being in side elevation and in a position where the hook bill has been inserted through the opening in its screw eye;

Figure 5 is a transverse sectional view taken approximately on the line 5—5 of Figure 4;

Figure 6 is a top plan view of the structure in Figure 5;

Figure 7 is a perspective view of the screw eye with which the hook of the previous figures is connected;

Figure 8 is a side elevational view of the fastener of Figure 4 after the shank and hook has been rotated 180°;

Figure 9 is a transverse sectional view taken on the line 9—9 of Figure 8;

Figure 10 is an elevational view of the fastener showing the intermediate rotational stage between that shown in Figures 4 and 8 that is, with the shank and hook rotated approximately 90° and illustrating the necessity for depressing the spring member on the screw eye so as to permit the hook to become engaged with its screw eye;

Figure 11 is a transverse sectional view taken on the line 11—11 of Figure 10; and Figure 12 is a fragmentary perspective view of a modified eye at one end of the shank of any of the previous illustrations of the fastener.

In the accompanying drawings the principles of the invention are demonstrated by several embodiments. With each the environment is suggested to be two devices 10 and 12, these devices being arranged for movement with respect to each other either by having one stationary and the other movable or by having both movable. For illustrative purposes only it is assumed that device 10 is a door jamb while device 12 is a door, although either or both of these may be substituted by other devices that are controlled by the fastener 14.

Fastener 14 consists of a one-piece wire element that is made into a shank 16, the latter being preferably straight. An eye 18 is at one end of shank 16 and protrudes laterally in one direction therefrom. A hook 20 is at the opposite end of shank 16 and protrudes laterally therefrom in the opposite direction. Eye 18 is formed by bending a short length of the wire as at 22 at right angles to the longitudinal axis of the shank 16 and then returning a loop 24 thereon. The hook 20 is made by forming a U-shape at the end of shank 16 and it is preferred that the hook 20 have a bill, 26 that protrudes slightly beyond the plane of the shank 16.

Eye 18 is mounted swivelly in the eye 28 of screw eye 30. Screw eye 30 is anchored in device 12. Another screw eye 32 is anchored in device 10 and is adapted to be engaged by hook 20. In practical use the shank 16 hangs loosely downwardly on the screw eye 30 by being suspended from eye 24. When it is desired to latch the devices 12 and 10 together shank 16 is lifted and the bill 26 passed through the opening in the second screw eye 30. After permitting the hook to drop fully down in the screw eye 30, shank 16 together with hook 20 and eye 18 at the ends thereof are rotated 180° in order to bring the bill 26 of the hook in such position that it is facing upwardly instead of downwardly. By so rotating the shank, hook 20 is reversed that is, it opens upwardly instead of the normal downward opening thereof. A part of shank 16 very close to hook 20 comes to bear against the top surface of screw eye 32 thereby establishing a rest position. The hook 20 is made sufficiently deep so that when in the rest position (Figure 3) the bight part of hook 20 together with a portion of the eye of screw eye 32 constitutes a loop within which to accommodate the padlock 38 or an equivalent additional locking device.

In addition to the basic arrangement disclosed in Figures 1–3 further attachments may be made. For example, a surface of hook 20 may be serrated as at 40 to offer resistance to the inadvertent or intentional unauthorized separation of hook 20 from the second screw eye 32. Second screw eye 32 may be substituted by screw eye 44 that is characterized by a spring member 46. This spring member is a flat spring having an aperture 48 in it that is aligned with the aperture in eye in screw eye 44. Flat spring member has a tab 50 at one end that is welded or otherwise fixed to the shank of screw eye 44. It has an eye at the opposite end in which the aperture 48 is formed. This eye is curved in longitudinal cross section or is offset so that it is normally held separated from the eye of screw eye 44 (Figure 5). Inasmuch as it is made of spring metal or other spring material, spring member 46 must be manually depressed in the operation and use thereof. Therefore it is to be understood that the construction shown in Figures 1–3 may be used with or without serrations 40 and with either screw eye 32 or screw eye 44.

Figures 4–11 demonstrate the locking action of the fastener 56, the latter being designated differently from that of Figure 1 only because the operation depicted in Figures 4–11 is in connection with the screw eye 44 instead of the screw eye 32. The basic shape of the shank 57, eye 58 at one end thereof, hook 59 at the opposite end thereof and bill 60 bear on, is identical to the shape depicted in Figures 1–3. In order to lock device 12 and device 10 together the bill 60 is inserted through the aligned openings 48 and 62 of the second screw eye 44. As seen in Figure 5 this may be done very freely inasmuch as there is ample clearance for such insertion of bill 60. In this condition (Figure 6) eye 58 and hook 59 are on the same side of the first and second screw eyes 64 and 44, but the eye 58 and the hook 59 protrude from opposite sides of shank 57. This means that the shank 57 extends diagonally across the screw eyes 64 and 44.

Then, the shank 56 is grasped by the fingers and rotated approximately 180°. As the shank rotates it passes to a position shown in Figures 10 and 11, this being approximately 90° or 100° of rotation of shank 56. The distance across the sides of hook 59 is such that the member 46 must be depressed as serrations 40 of hook 59 pass thereover. Otherwise the combined thickness formed by the eyes of the screw eye 44 and member 46 will not permit the rotation of hook 59 since the distance across it would not be sufficient. After depressing member 46 to become flush with the eye of screw eye 44, the hook 59 may pass to the position shown best in Figures 8 and 9. This latter position is after the shank 56 together with its hook 59 has been rotated 180° from the initial starting position of Figure 4. Here, the bill 60 faces upwardly as does the hook 59. There is enough inherent elasticity in member 46 so that the part of shank 56 immediately adjacent to hook 59 that is contacted by member 46, is elevated (Figure 8). In order to release the fastener attention is invited to Figure 8. It is seen that the procedure followed to couple the hook with the screw eye 44 has to be reversed. Therefore a positive downward force has to be applied on the shank 56 in order to depress member 46 (Figure 11). Then the shank 57 has to be rotated 180° to reach the position shown in Figure 4. During these movements the serrations 40 aid in holding the hook fastened to screw eye 44 so that a positive force applied directly to the fastener is virtually the only way that the fastener can be disconnected. When the position shown in Figure 4 is reached by following the procedure described previously, the shank 57 still has to be lifted to completely separate bill 60 of hook 59 from the screw eye 44.

Some difficulty has been encountered in having ordinary hooks fail to return to a gravitationally lowered position that is, with the shanks thereof approximately vertical. Therefore Figure 12 has a solution to this problem wherein the shank 70 of the fastening hook has an elongated eye 72 at one end. This elongated eye has a part 74 that is in a plane perpendicular to the longitudinal axis of shaft 70. This part is preferably formed with an elongated opening 76 so that there will be ample slack in the connection of the eye 72 with the screw eye in one of the devices, for example device 12. The remaining part 78 of eye 72 is at right angles to the part 74 and is in the same plane as the shank 70. In use of the eye 72, the same operational steps as described in connection with the disclosure in Figures 1–11 are followed. However, the fastener will fall downwardly in the desired position at all times after use.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a fastener for two devices that are movable with respect to each other, a first screw eye in one of the devices, a shank, an eye at one end of said shank protruding laterally therefrom and connected with said first screw eye, a hook having a bill and located at the opposite end of said shank and projecting laterally from said shank in a direction opposite to the direction which said eye protrudes, a second screw eye attached to the other of said devices with which said hook is engageable by having said bill pass into it and rotating said shank approximately one hundred and eighty degrees so that a part of the shank adjacent to said hook bears against a part of the said second screw eye so that for said hook to become separated from said second screw eye it must be first rotationally returned one hundred and eighty degrees, said hook and said eye each being in planes that are parallel to each other and normal to the longitudinal axis of said shank.

2. In a fastener for two devices that are movable with respect to each other, a first screw eye in one of the devices, a shank, an eye at one end of said shank protruding laterally therefrom and connected with said first screw eye, a hook having a bill and located at the opposite end of said shank and projecting laterally from said shank in a direction opposite to the direction which said eye protrudes, a second screw eye attached to the other of said devices with which said hook is engageable by having said bill pass into it and rotating said shank approximately one hundred and eighty degrees so that a part of the shank adjacent to said hook bears against a part of the said second screw eye so that for said hook to become separated from said second screw it must be first rotationally returned one hundred and eighty degrees, said hook and said eye each being in planes that are parallel and normal to the longitudinal axis of said shank, a loop to receive a padlock formed by a part of said hook and said second screw eye when said hook is in said second screw eye.

3. A fastener comprising a fixed eye, a shank, an eye protruding laterally from said shank at one end thereof and swivelly connected to said first fixed eye, a second fixed eye, a hook at the opposite end of said shank and engageable with said second fixed eye, means operatively connected with said hook and said second fixed eye for releasably locking said hook in said second fixed eye, said hook opening in a direction laterally of the longitudinal axis of said shank in a direction opposite to the direction which said eye protrudes and being approximately U-shaped, said hook having a bill adapted to enter said second fixed eye, said shank being rotatable about the first fixed eye and the eye on the opposite end thereof approximately one hundred and eighty degrees until said hook faces upwardly whence a part of said shank is disposed immediately above said second fixed eye, said locking means including a spring member which is operatively connected to a part of said hook and which is normally spread from said second fixed eye to form with said second fixed eye a thickness that exceeds the distance across said hook whereby in order to rotate said hook in said second fixed eye said spring member must be depressed upon said second fixed eye.

4. The combination of claim 3 wherein at least a part of said hook has serrations which face said spring member and which are in contact therewith when said shank is rotated.

5. The combination of claim 3 wherein the eye at one end of said shank has an elongated opening in it to permit said shank to fall freely downwardly when released from said second eye.

6. In a fastener for two devices that are movable with respect to each other, a first screw eye in one of the devices, a shank, an eye at one end of said shank protruding laterally therefrom and connected with said first screw eye, a hook having a bill and located at the opposite end of said shank and projecting laterally from said shank in a direction opposite to the direction which said eye potrudes, a second screw eye attached to the other of said devices with which said hook is engageable by having said bill pass into it and rotating said shank approximately one hundred and eighty degrees so that a part of the shank adjacent to said hook bears against a part of the second screw eye so that for said hook to become separated from said second screw eye it must be first rotationally returned one hundred and eighty degrees, and locking means for releasably retaining said hook in said second screw eye, said locking means including serrations on a surface of said hook which are engageable with said second screw eye, and an apertured spring member fixed to said second screw eye through which said hook is passed, said member being movable toward the ey of said second screw eye to permit the hook to be separated therefrom and said member being normally spaced therefrom to prevent inadvertent separation of said hook from the second screw eye.

7. A fastener comprising a fixed eye, said eye including a shank portion and a loop portion, a spring member attached to said shank portion, said spring member having a looped portion which is in alignment with said eye looped portion, and which is normally spread therefrom.

8. A fastener comprising a fixed eye, a shank, an eye protruding laterally from said shank at one end thereof and swivelly connected to said fixed eye, a hook at the opposite end of said shank engageable with another fixed eye, said hook opening in a direction laterally of the longitudinal axis of said shank opposite to said eye and being approximately U-shaped, said hook having a bill adapted to enter another fixed eye, said shank being rotatable about said fixed eye and the eye on the opposite end thereof approximately one hundred and eighty degrees until said hook faces upwardly, at least a part of said hook having inwardly facing serrations thereon, the eye at one end of said shank having an elongated opening in it to permit said shank to fall freely downwardly when released from a second fixed eye.

References Cited in the file of this patent

UNITED STATES PATENTS

| | | |
|---|---|---|
| 684,877 | Smoot | Oct. 22, 1901 |
| 708,910 | Noyes | Sept. 9, 1902 |
| 1,234,132 | Cluts | July 24, 1917 |
| 2,634,996 | Cooper | Apr. 14, 1953 |
| 2,665,152 | Piercey | Jan. 5, 1954 |

FOREIGN PATENTS

| | | |
|---|---|---|
| 342,094 | Great Britain | Jan. 29, 1931 |